United States Patent [19]
Arends et al.

[11] Patent Number: 5,939,107
[45] Date of Patent: Aug. 17, 1999

[54] PREHEATER FOR DIFFERENTIAL PRESSURE FORMING MACHINE

[76] Inventors: Albert W. Arends, 3017 NS. Dr.; Andrew P. Richard, 203 N. Bowery St., both of Gladwin, Mich. 48624

[21] Appl. No.: 08/873,342

[22] Filed: Jun. 11, 1997

[51] Int. Cl.⁶ .............................. B29B 13/02; B29C 31/00
[52] U.S. Cl. ........................... 425/397; 219/388; 226/90; 226/91; 226/118.2; 392/415; 392/416; 392/417; 425/384; 425/387.1; 425/388; 432/8; 432/59
[58] Field of Search ...................................... 264/544, 553, 264/554; 425/384, 397, 387.1, 388; 392/417, 415, 416; 432/8, 59; 219/388; 226/118.1, 118.2, 90, 91

[56] References Cited

U.S. PATENT DOCUMENTS

| | | | |
|---|---|---|---|
| 2,050,053 | 2/1936 | Graf et al. | 226/90 |
| 3,346,923 | 10/1967 | Brown et al. | |
| 3,459,410 | 8/1969 | Uban | 263/3 |
| 3,664,791 | 5/1972 | Brown | 425/156 |
| 3,722,774 | 3/1973 | Scheinderman et al. | 226/90 |

OTHER PUBLICATIONS

Hemmerle Publication Involving PP–BHJ6 Infra–Red Preheater Including Four Pages.

Primary Examiner—Jan H. Silbaugh
Assistant Examiner—Dae Young Lee
Attorney, Agent, or Firm—John J. Swartz

[57] ABSTRACT

A preheater and method of preheating a thermoplastic sheet prior to entry of the sheet into a differential pressure forming machine which forms an article in the sheet. The preheater includes mechanism for initially threading a sheet in a generally horizontal plane, mechanism for concurrently displacing upstream and downstream portions of the sheet in vertically opposite directions relative to the horizontal plane to dispose a portion of the sheet in an upstanding plane. A heater is provided for heating the upstanding portion of the sheet in the upstanding plane. After the sheet has been repositioned with a portion in the upstanding plane, the heater is laterally moved from an inoperative position to a sheet heating position receiving the portion of the sheet at the sheet heating station. Mechanism is provided for selectively moving the sheet downstream after the sheet has been vertically displaced.

31 Claims, 7 Drawing Sheets

PREHEATER FOR DIFFERENTIAL PRESSURE FORMING MACHINE

BACKGROUND OF THE INVENTION

1. Field of the Invention

This invention relates to thermoforming equipment for differentially pressure forming an article in a sheet of thermoplastic material and more particularly, to apparatus for preheating the sheet prior to its entry into a differential pressure thermoforming machine.

2. Description of the Prior Art and Objects

Differential pressure forming apparatus, such as that disclosed in U.S. Pat. No. 3,346,923 issued to G. W. Brown, et al, on Oct. 17, 1967 and U.S. Pat. No. 3,664,791, issued to G. W. Brown on May 23, 1972, which are incorporated herein by reference as though fully set forth herein, have been provided heretofore for successively delivering a heated thermoplastic sheet to an oven at a sheet heating station and then to a forming station at which molds engage the sheet to differentially pressure form an article in the sheet.

In these prior art machines, the thermoplastic sheet is typically laterally captured by impaling the lateral edges of the sheet on sheet carrying chains which carry the sheet through the differential pressure forming machine while the articles are being formed therein. Such machines typically include ovens which heat the sheet prior to applying differential pressure to the sheet at a forming station. It has been found that, with some plastics, when the sheets are initially heated, they stretch and twist. If the plastic sheets are laterally captured, wrinkles sometimes develop in the sheets which obviously cause formation problems resulting in defects in the product being formed.

Toward this end, preheaters have been provided heretofore for heating the thermoplastic sheet prior to its entry into the oven of a thermoforming machine.

One such preheater has included a plurality of heated rolls around which the sheet is successively turned or wrapped. A sufficient number of rolls are utilized to preheat the sheet to a desired temperature prior to its entry into the thermoformer or oven. While passing through the preheater, the sheet is not laterally restricted. The problems attendant to this prior art construction, is that the sheet heating rolls are rather expensive and it is inconvenient to successively thread the sheet in a seriatim fashion through and around the rolls. Accordingly, it is an object of the present invention to provide a new and novel preheater machine for preheating a thermoplastic sheet prior to its entry into a thermoformer oven.

It is another object of the present invention to provide a preheater for reducing the cost and increasing the convenience of preheating the thermoplastic sheet.

Another type of preheater is sold by the Hemmerle Corporation under the trademark or model no. PP-BH23 which includes a vertically disposed oven that provides a vertical tunnel through which a thermoplastic sheet passes before entering the thermoforming machine. The sheet is fed in a horizontal path into the machine through an inlet and thence downwardly where the sheet is trained around a set of lower rollers and thence upwardly through the vertical oven and thence over top rollers and then downwardly through a discharge opening. A serious problem attendant to this machine is the inconvenience and time required to thread the sheet around the vertically and horizontally spaced apart rollers and pass the sheet through the preheater oven chamber. The preheater oven is initially laterally moved out of the path of the sheet until the threading is complete and then the oven is returned to a sheet heating position adjacent the sheet. Accordingly, it is another object of the present invention to provide a preheater which will eliminate the disadvantages of the prior art machines.

Still another of the present invention is to provide a preheater for preheating a thermoplastic sheet which will increase the speed and efficiency of operation.

Another object of the present invention is to provide a preheater of the type described which includes sheet displacing mechanism which will minimize the time required to thread the thermoplastic sheet through the pre-heater.

A further object of the present invention is to provide a method of preheating and a preheater of the type described including sheet displacement mechanism for threading the sheet through a preheating station, in a horizontal path, concurrently vertically displacing upstream and downstream portions of the sheet at the preheating station in vertically opposite directions to provide a vertical sheet portion which is laterally aligned with a vertical passage provided in a vertical sheet heating oven.

A still further object of the present invention is to provide a preheater and method of preheating of the type described which will allow the thermoplastic sheet to be initially disposed in a horizontal plane at the sheet heating station and then vertically moving upstream and downstream portions of the sheet in different vertical directions while the remainder of the sheet remains horizontal to provide a vertical sheet portion which is received by a vertical oven.

Another object of the present invention is to provide a preheater for preheating a thermoplastic sheet of the type described including apparatus, having inlet and outlet rollers, for initially disposing the sheet in a horizontal plane at a sheet heating station, vertically displacing upstream and downstream portions of the sheet at the sheet heating station between the inlet and outlet rollers to vertically spaced apart positions to provide an upstanding sheet portion, apparatus for laterally moving a vertical oven between a laterally removed position and a sheet heating position vertically adjacent the upstanding sheet portion, and apparatus for moving the sheet in a downstream path.

A further object of the present invention is to provide a preheater of the type described which includes inlet and outlet rollers which grip inlet and outlet portions of the sheet and hold the sheet while portions of the sheet between the inlet and outlet rollers are vertically displaced to provide a vertical sheet portion which is heated by an upstanding vertical oven.

It is a still further object of the present invention to provide new and novel preheating mechanism, of the type described including nip forming rolls which are moveable between relaxed positions allowing a thermoplastic sheet to be threaded therethrough and nip forming positions holding inlet and outlet portions of the sheet.

It is another object of the present invention to provide preheating mechanism of the type described which includes an outlet nip forming roll which will grip and clamp the downstream portion of the sheet to preclude movement of the sheet in an upstream direction when portions of the sheet are moved vertically out of the plane of the sheet to provide a vertical sheet portion that is received by a vertical oven.

It is another object of the present invention to provide a preheater of the type described including new and novel carriage mechanism for concurrently moving downstream and upstream portions of the sheet in vertically opposite directions to provide a vertical sheet portion which is disposed in a vertical position receivable by a laterally moveable oven.

Another object of the present invention is to provide a method of preheating a sheet including the steps of threading a continuous sheet in a first plane, transversely concurrently displacing upstream and downstream portions of the sheet in opposite directions relative to the first plane to dispose a transverse portion of the sheet between the upstream and downstream sheet portions in a second plane transverse to the first plane, and thereafter, moving the sheet in a downstream path of travel and heating the transverse portion of the sheet.

Other objects and advantages of the present invention will become apparent to those of ordinary skill in the art as the description thereof proceeds.

SUMMARY OF THE INVENTION

Apparatus for preheating a thermoplastic sheet in which an article is to be differentially pressure formed therein comprising: mechanism on the frame for supporting a continuous, longitudinally extending thermoplastic sheet in a first plane; displacement mechanism for concurrently displacing upstream and downstream portions of the sheet in opposite directions relative to the first plane to dispose a portion of the sheet at a sheet heating station in a second plane transverse to the first plane; heating mechanism for heating the portion of the sheet in the second plane at the sheet heating station; and mechanism for moving the sheet in a downstream path of travel when the placement mechanism has displaced the upstream and downstream portions of the sheet. The invention also contemplates a method of preheating a sheet including passing a sheet through a preheater in a horizontal plane at a sheet heating station, and insitu concurrently vertically displacing upstream and downstream sheet portions of the horizontally disposed sheet at the sheet heating station in vertically opposite directions to dispose a portion of the sheet between the upstream and downstream portions in a vertical path.

DESCRIPTION OF THE DRAWINGS

The invention may be more readily understood by referring to the accompanying drawings, in which.

DESCRIPTION OF PREFERRED EMBODIMENT

Figure 1:
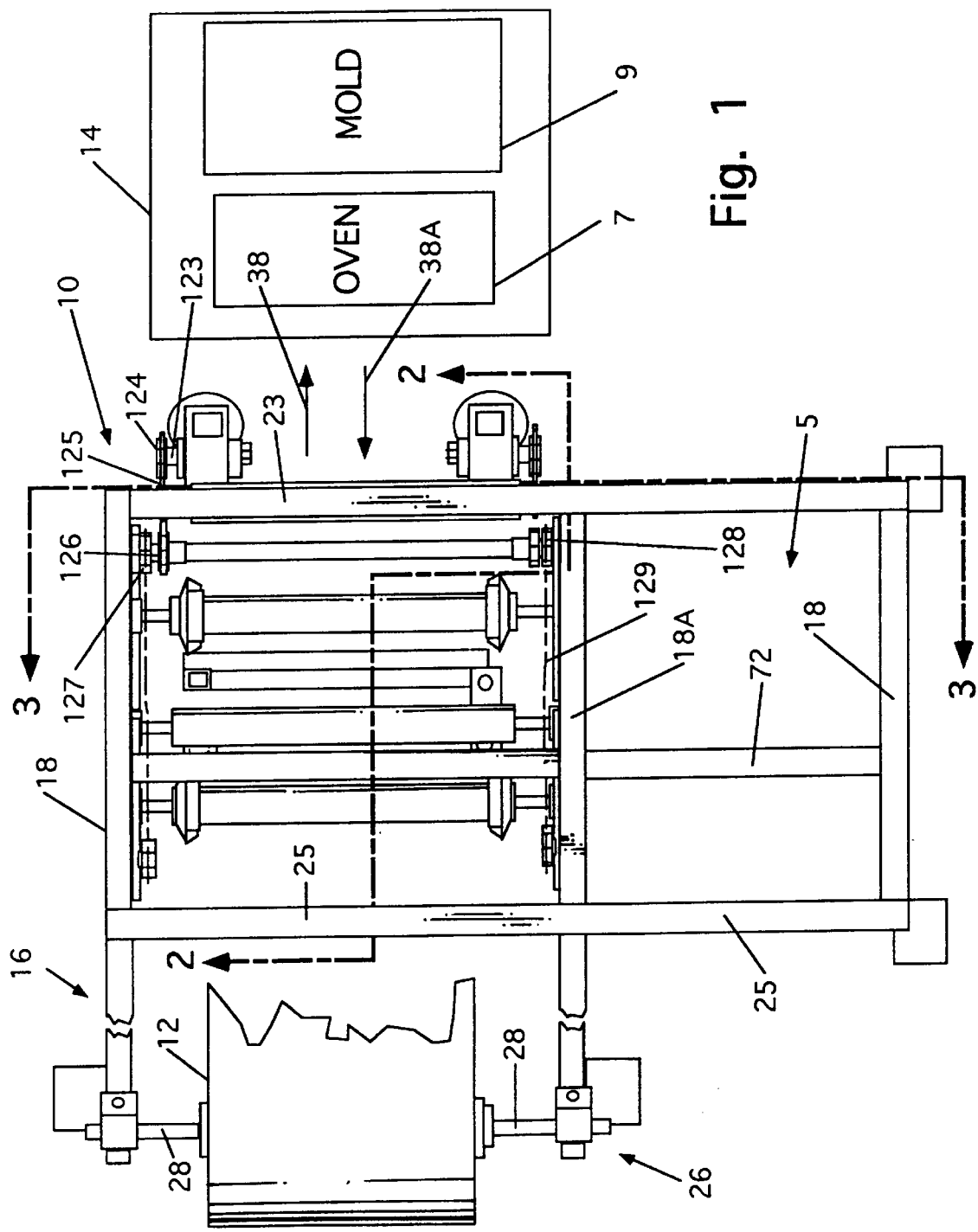
FIG. 1 is a top plan view of preheating apparatus constructed according to the present invention, illustrating a preheater oven disposed in a sheet heating position, parts of the apparatus being broken away for purposes of clarity.

A preheater constructed according to the present invention, generally designated 10, is particularly adapted for use in preheating a continuous, longitudinally extending, thermoplastic sheet of material, generally designated 12, prior to its entry into a thermoforming machine, schematically designated 14 and more particularly illustrated in either of the two aforementioned U.S. patents which are incorporated herein by reference as though fully set forth herein.

The thermoformer, schematically illustrated at 14, includes conventional laterally spaced apart chains on which the thermoplastic sheet 12 is carried for passage through an oven 7 and differential pressure molds 9 which differentially pressure form a part integrally with the sheet as more particularly illustrated in the aforementioned U.S. patents.

The preheater 10 includes a frame, generally designated 16, having a top pair of side frame members 18 and a bottom pair of side frame members 20, spanned by front, laterally spaced apart, upstanding frame bars 15 and 17 and rear, laterally spaced apart, upstanding frame bars 19 and 21. Longitudinally spaced apart upper and lower pairs of end frame members 23 and 25 span the vertical frame members 15, 17 and 19, 21, respectively. A pair of upstanding longitudinally spaced, vertical posts 22 and 27, span the midsections of front rails 23 and 25, respectively. Upper and lower horizontal rails 18A and 20A, respectively, span the posts 22 and 27.

The bottom frame bars 20,23 and 25 are illustrated as being supported in spaced relation with the ground via threaded pedestals 24.

The sheet 12 is a continuous sheet supplied from a roll, schematically designated 26, journaled on a shaft 28 for rotation on a side rails 30 fixed to the frame 16 via upstanding posts 15, 19, 22 and 27. The frame 16 defines a preheater oven storage section S for storing a preheater oven, generally designated 0, during the initial sheet threading.

INLET AND OUTLET FEED MECHANISM

Inlet and outlet roller mechanisms, generally designated 32 and 32A, respectively, are provided on the rear and front frame bars 19, 27 and 15, 22, respectively, for initially supporting the sheet 12 in a horizontal plane 36 and for selectively moving the sheet 12 downstream in a horizontal path, in the direction of the arrow 38.

The preheater 10, constructed according to the present invention, includes sheet displacing apparatus, generally designated 37, for vertically translating the sheet 12 from the initial threading position, illustrated in FIGS. 5 and 6, to the displaced position, illustrated in FIGS. 2 and 7, to provide an upstanding vertical sheet portion 12A which is received in the oven, generally designated O, as will be described more particularly hereinafter.

The inlet roller mechanism 32 includes a horizontal idler roller, generally designated 40, having a sheet receiving inlet roll 42 mounted on a shaft 44 which is journaled in a pair of bearing blocks 46 fixed to the laterally spaced apart, vertical rear frame bars 19 and 27. The inlet roller mechanism 32 further includes a second idler roll 48 fixed to a shaft 50 which is journaled on a pair of swing arms 52 that have ends 54 fixed to a horizontal shaft 56 that is journaled in a pair of laterally spaced apart suitable bearing blocks 58 fixed to the frame bars 19 and 27. The upstream idler rollers 42 and 48 cooperate, in the sheet gripping position illustrated in FIGS. 2 and 8, to form an upstream nip 49 which keeps the sheet 12 taut when the downstream roller mechanism 32A is not forwardly moving the sheet 12.

The inlet roller mechanism 32 includes a pair of double acting pneumatically operated cylinders 60, pivotally mounted on the frame bars 19 and 27, via pivot pins 62. Each cylinder 60 has a piston rod 64 pivotally coupled to one of the swing arms 52, via a coupling 66, for swinging the upstream idler roll 48 between the removed, sheet threading position, illustrated in FIGS. 5 and 6, and the nip forming, sheet holding position illustrated in FIGS. 2 and 8.

The downstream roller mechanism 32A is generally similar to the upstream roller mechanism 32 and generally similar parts are identified by generally similar reference characters followed by the letter A subscript. The roller mechanism 32A, relative to roller mechanism 32, is inverted such that when the sheet 12 is initially threaded through the machine, the pivotal roll 48A will be disposed below the sheet 12. The roll 42A, which spans front posts 15 and 17, also differs from roll 42 in that whereas roll 42 is free wheeling, the drive roller 42A is driven. The drive shaft 44A for roller 42A mounts a sprocket wheel 43 which is selectively driven to drive the sheet 12 downstream in the direction of the arrow 38 when the roll 48A is swung to the sheet gripping, nip forming position illustrated in FIG. 2.

The drive roll 42A of the downstream roller assembly 32A is driven via a chain 59 which is trained around the sprocket wheel 43 and a sprocket wheel 61 fixed to an output shaft 63 of a gear box 65 that is driven via an electrically operated servomotor 67 fixed to the upstanding front frame bar 16.

OVEN

The preheater oven or heating mechanism O includes a subframe, generally designated 70, mounted for lateral movement on upper and lower laterally extending rails 72 and 74, respectively, fixed to the upper and lower main frame bars 18 and 20, respectively.

The subframe 70 includes upstanding frame bars 76 and 78 spanning upper and lower frame bars 75 and 77, respectively, which mount front and rear vertically disposed, solid heat emanating panels 80 and 82, respectively, defining a vertical sheet heating tunnel 83 therebetween. A plurality of electrically energized wire coils 84 are imbedded in the panels 80, 82 for inwardly emanating heat, represented by the arrows 86, for heating the vertical sheet portion 12A disposed in the tunnel 83.

The oven subframe 70 is supported for rolling movement in a lateral direction on the upper laterally extending rail 72 via upper a pair of laterally spaced apart roller assemblies 88, which hang from track 73 mounted on the upper rail 72. The oven O is also stabilized in a front to rear direction via a lower roller mechanism, generally designated 89, mounted on a bracket 90 depending from the oven subframe 70 and received in a laterally extending track or slot 92 defined by the lower rail 74 and a laterally extending frame bar 93 mounted on the rail 74 via a plate 94.

Figure 2:
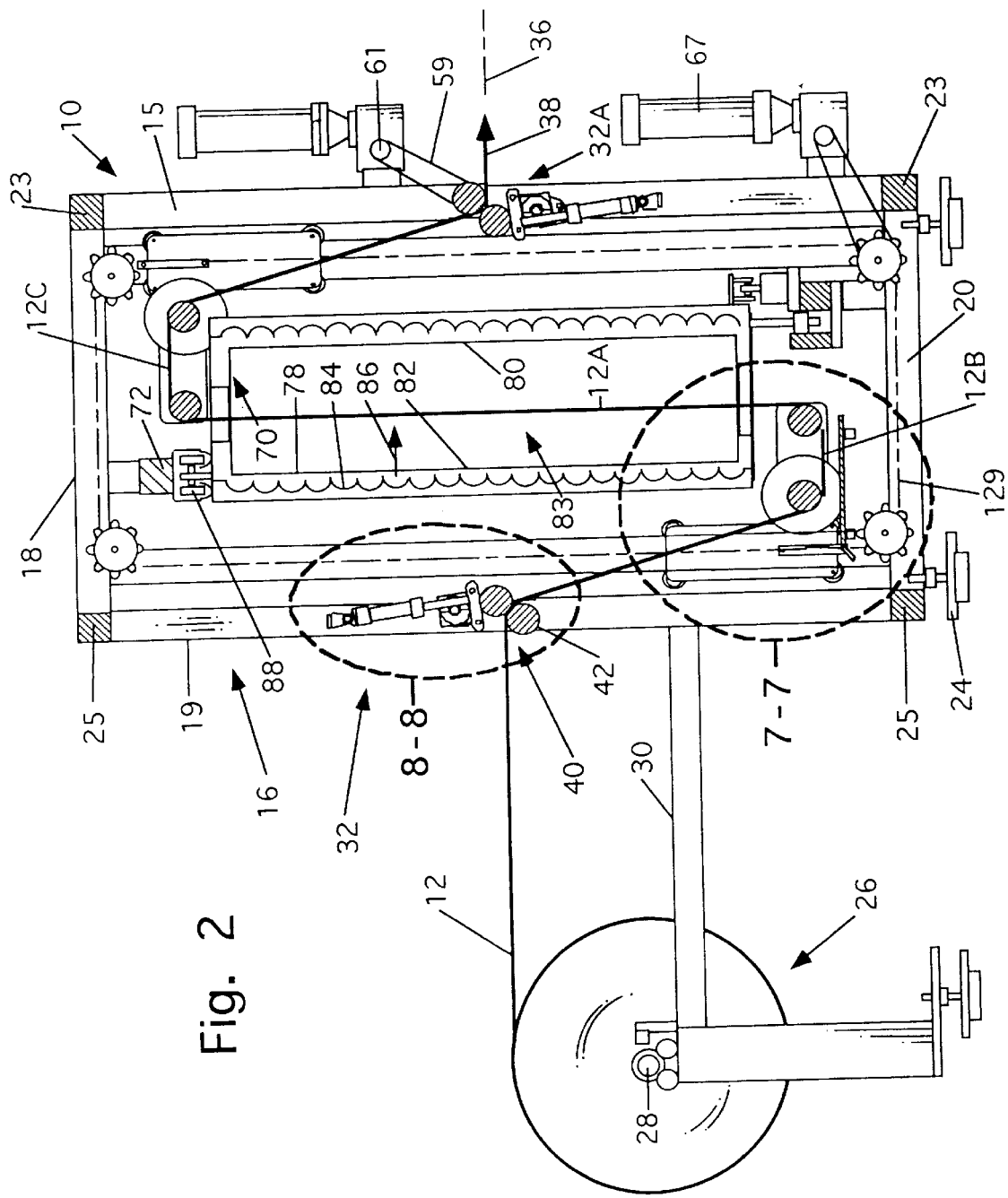
FIG. 2 is a sectional side view of the preheating apparatus constructed according to the present invention, taken along the section line 2—2 of FIG. 1 illustrating sheet displacement carriages in vertically displaced positions.
Figure 3:
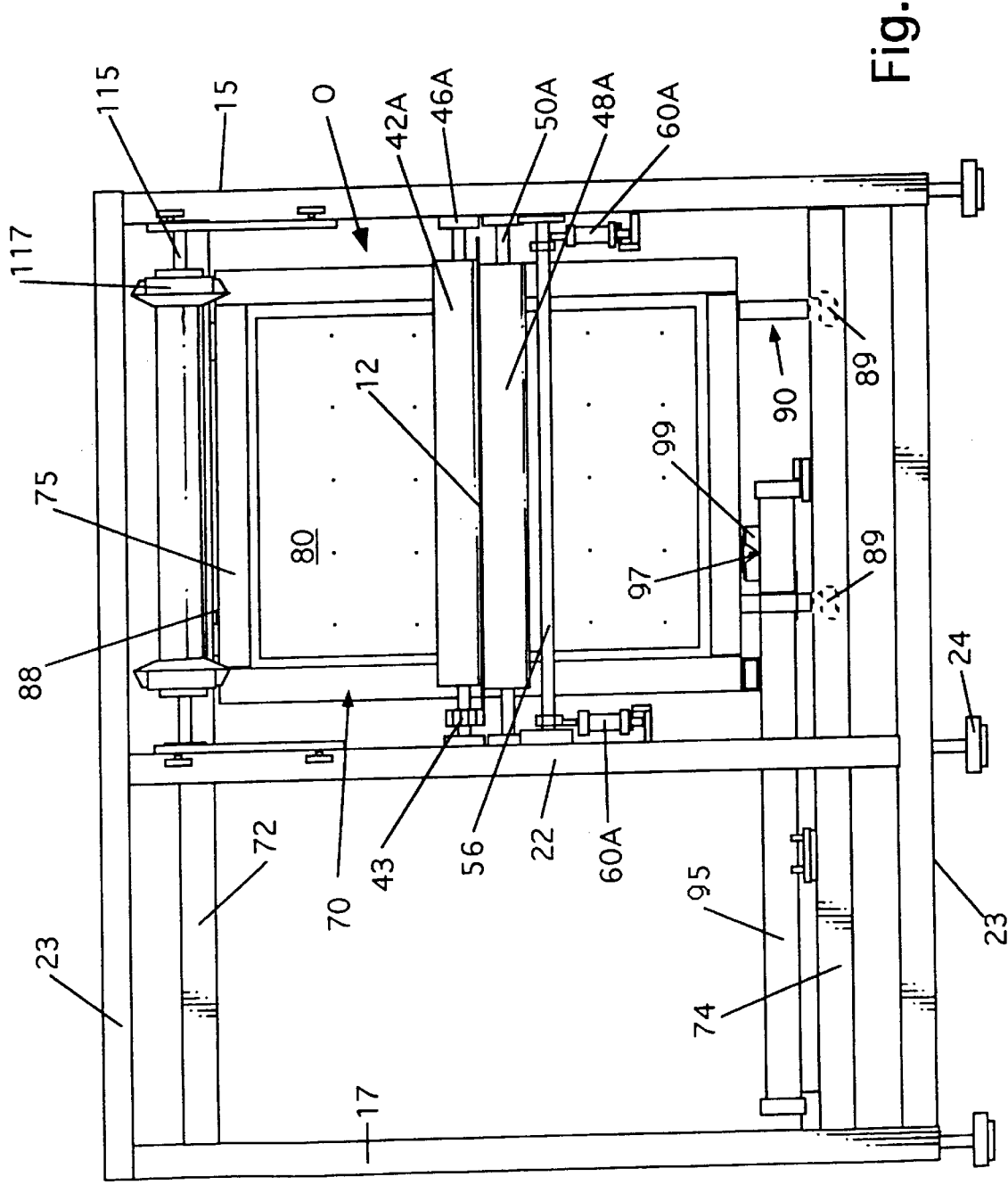
FIG. 3 is a front end elevational view of the preheating apparatus, taken along the line 3—3 of FIG. 1.
Figure 4:
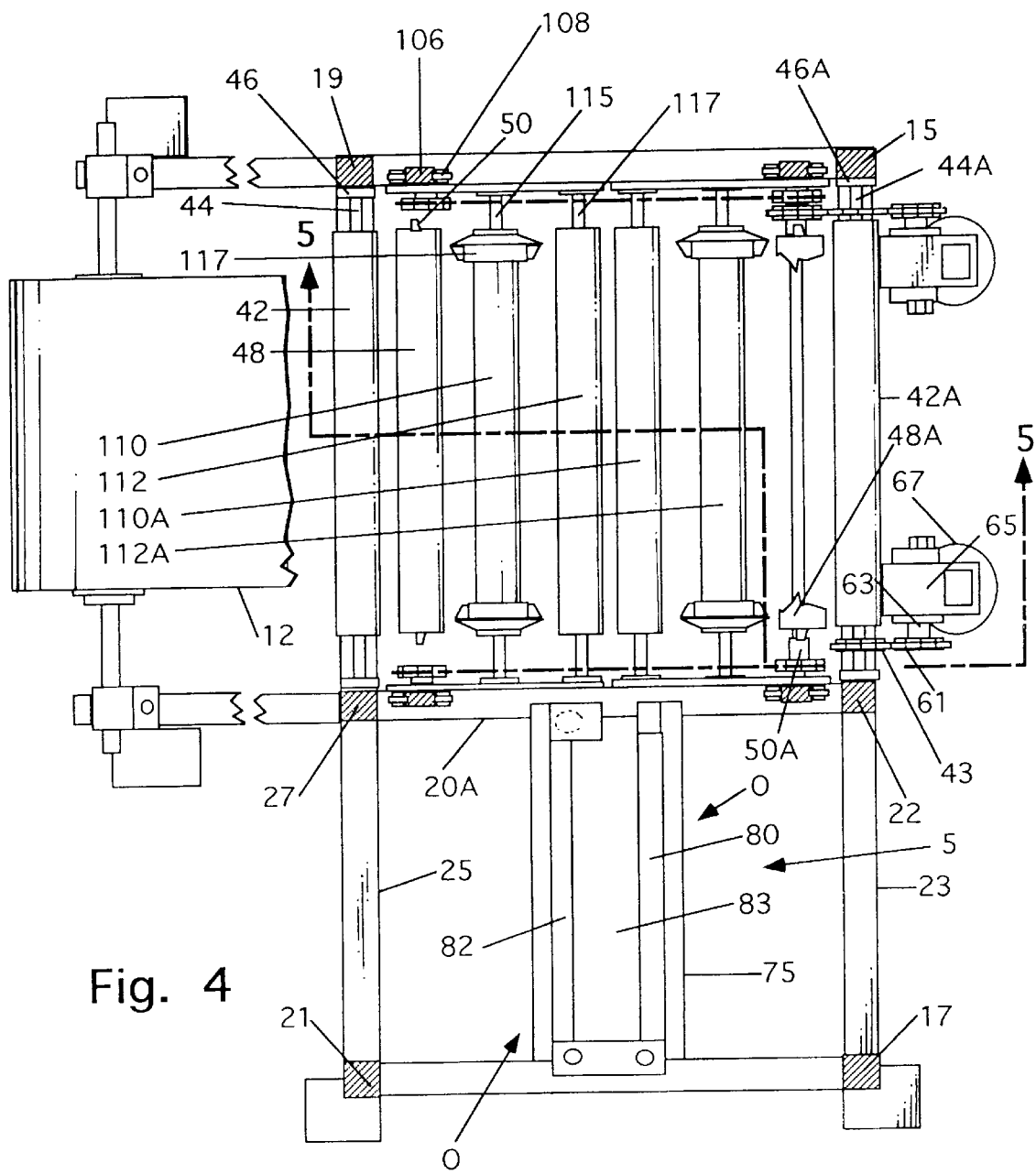
FIG. 4 is a top plan sectional view thereof, taken along the section line 4—4 of FIG. 5, illustrating the preheater oven in a laterally removed position, parts being broken away to better illustrate underlying parts.

A double acting, solenoid actuated, pneumatic drive cylinder, generally designated 95, is provided for laterally moving the oven O between a laterally removed position, removed from the sheet 12 as illustrated in FIG. 4, and a sheet heating position, illustrated in FIGS. 1 and 2, in which the vertical sheet portion 12A will be received by the vertical oven tunnel 83 heated by the heat emanating from the electrically energized coils 84. The frame mounted pneumatic cylinder 95 drives an upstanding piston rod 97, which is coupled to a bracket 99 coupled to the oven frame 70, for laterally moving the oven frame 70 between the positions illustrated in FIGS. 3 and 4.

SHEET DISPLACEMENT CARRIAGES

Figure 5:
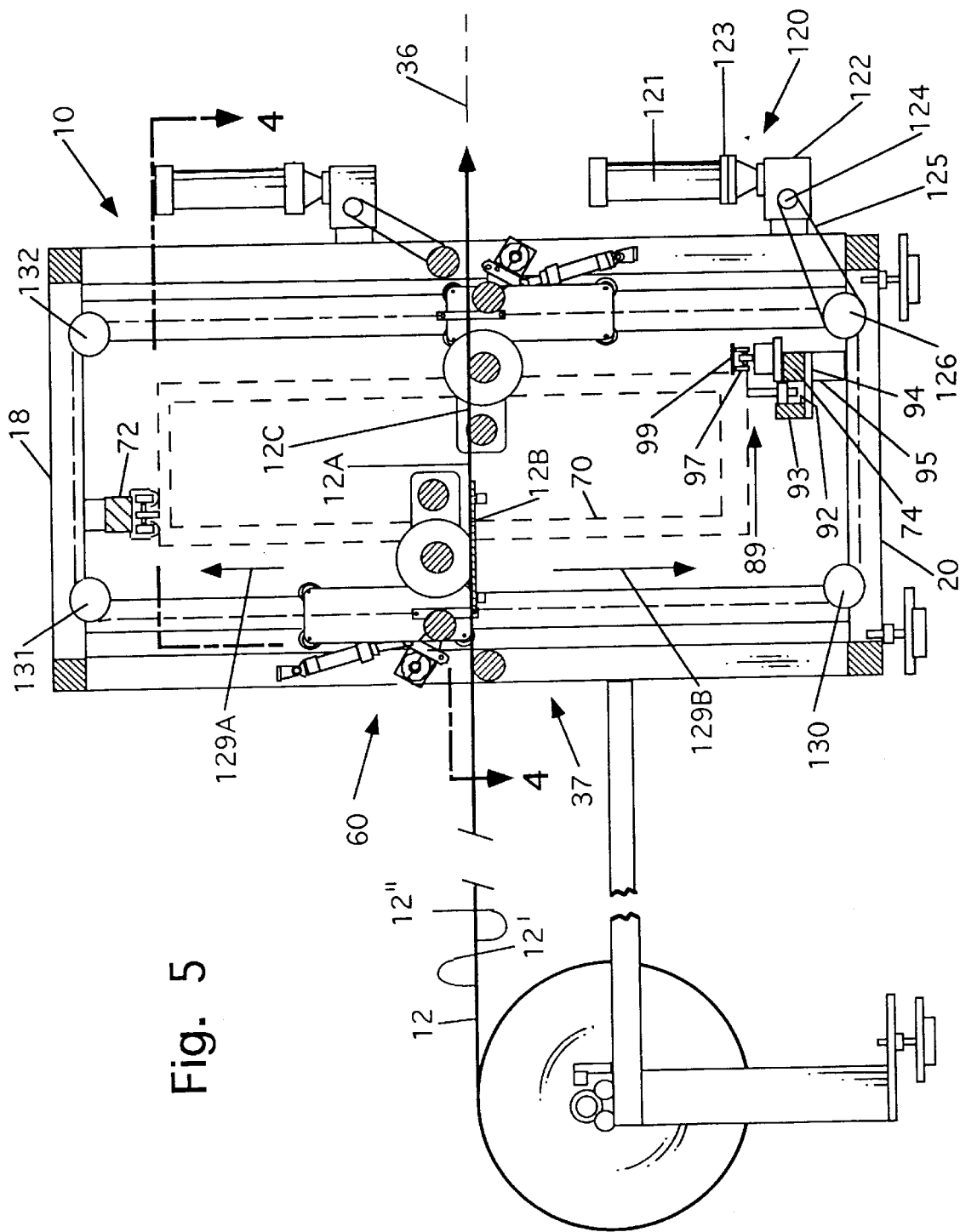
FIG. 5 is a sectional side view of preheating apparatus constructed according to the present invention, taken along the section line 5—5 of FIG. 4, illustrating sheet displacement mechanism in a sheet threading position in which a thermoplastic sheet is initially threaded therethrough in a horizontal plane, and schematically illustrating the position of the preheater oven in phantom lines in a sheet heating position.
Figure 6:
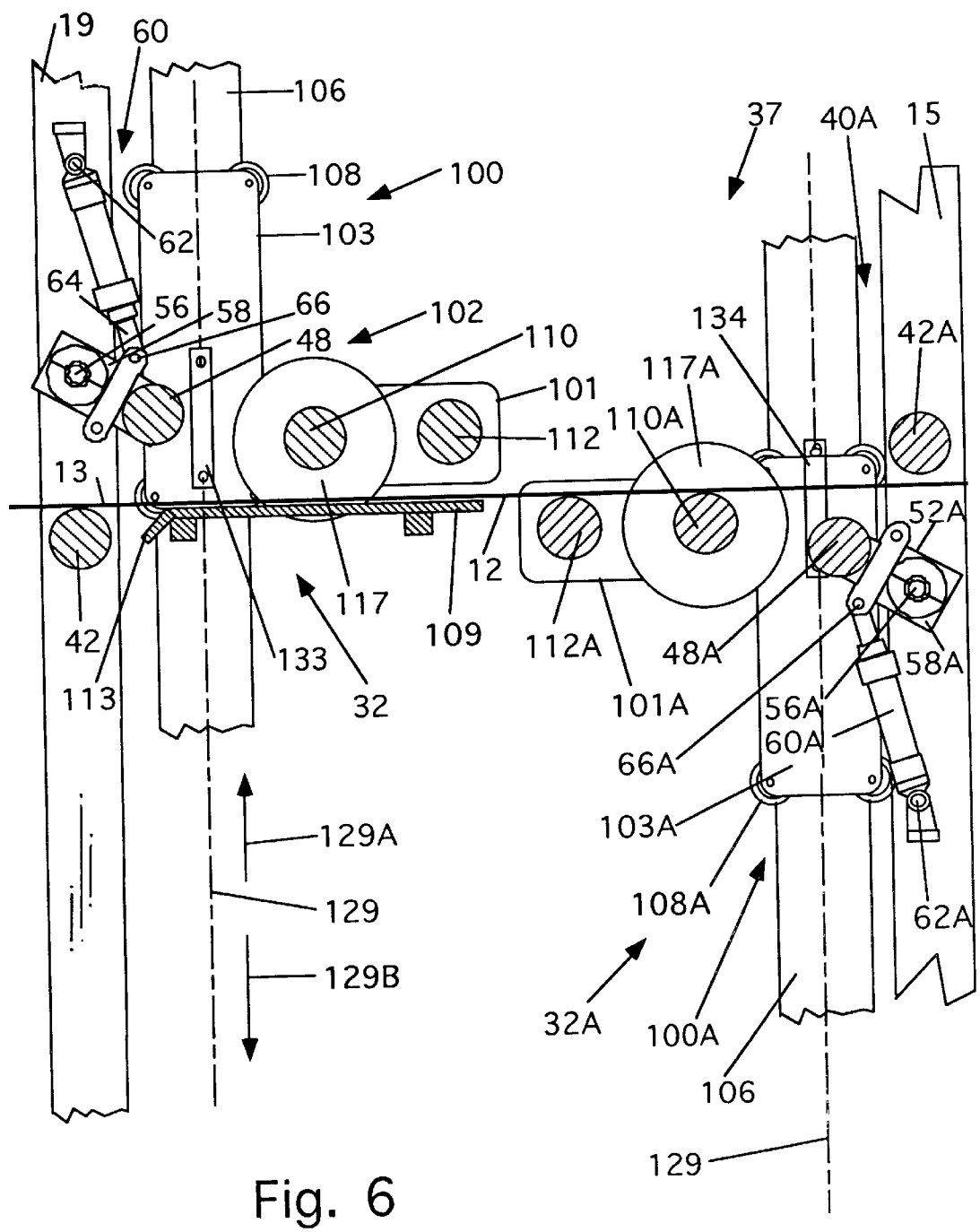
FIG. 6 is a greatly enlarged, fragmentary sectional side view of only the sheet displacing carriages illustrated in FIG. 4 in the sheet threading positions.
Figures 7, 8:
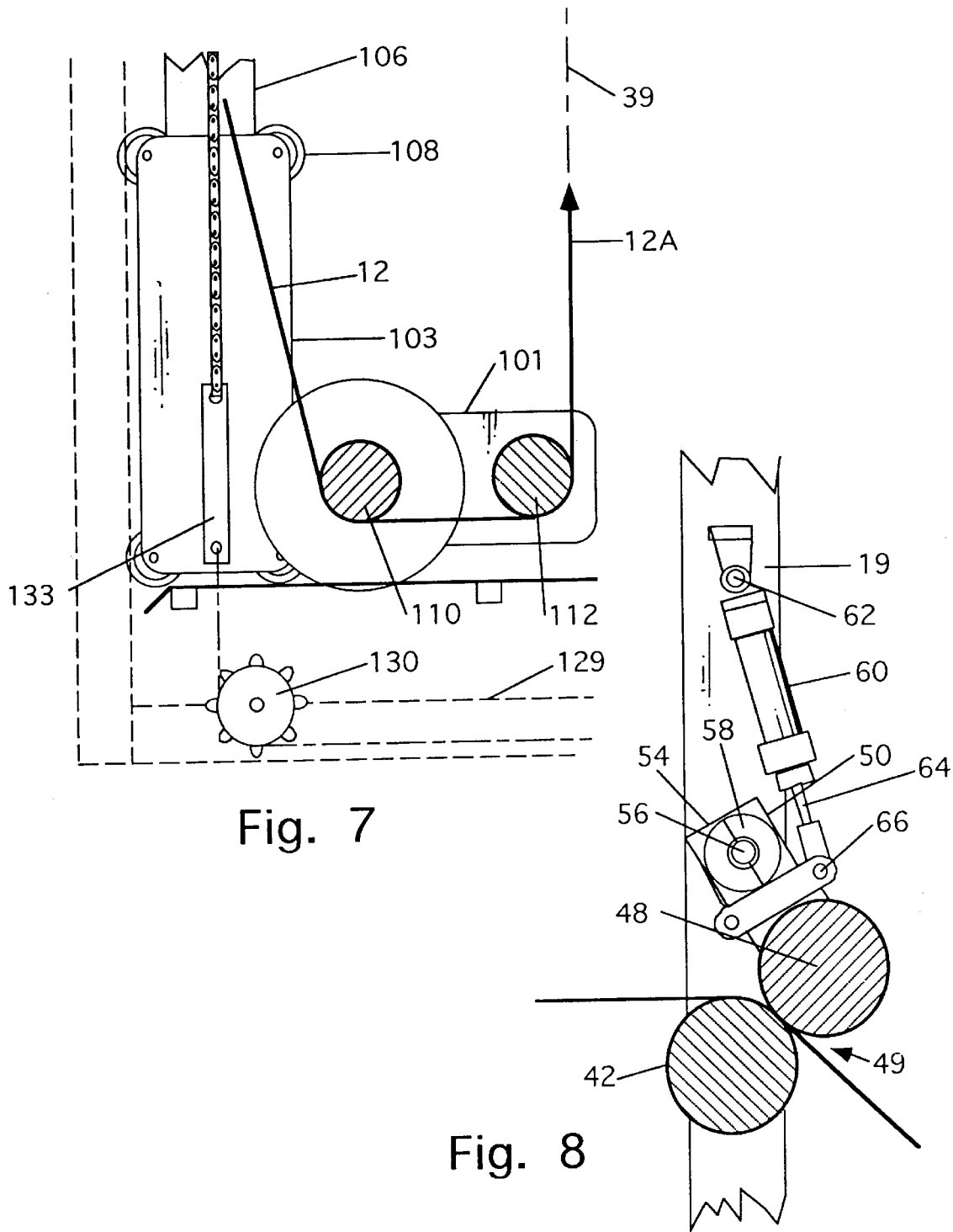
FIG. 7 is a greatly enlarged sectional side view of the portion of one of the sheet displacing carriages in a lowered, sheet displacing position, encircled in the chain line 7—7 of FIG. 2.
FIG. 8 is a greatly enlarged sectional side view of the upstream nip forming roll mechanism only, encircled in the chain line 8—8 of FIG. 2.

The sheet displacing apparatus 37 reposition the sheet portion 12A from the horizontal position, in the plane 36, as illustrated in FIGS. 5 and 6, to the upstanding position, in a transverse, upstanding plane 39, as illustrated at 12A in FIGS. 2 and 7. The sheet displacing apparatus 37 includes upstream and downstream pairs of laterally spaced apart carriages, generally designated 100 and 100A, respectively. The carriages 100 each includes an L-shaped bracket 102 which is mounted for vertical movement on a frame supported, vertical guide rail 106, which span the side rails 18, 20 and 18A and 20A, respectively. The L-shaped carriage brackets 102 include vertical legs 103 which mount guide rollers 108 for rolling movement on guide rails 106 between the sheet threading positions, illustrated in FIGS. 5 and 6, and the sheet displacing positions illustrated in FIG. 2.

A pair of sheet displacing idler rollers, generally designated 110 and 112, are mounted on shafts 115 and 117 which are journaled on bearings 114 and 116, respectively, mounted on the horizontal legs 101 of L-shaped side frame brackets 102 for rotation about horizontal axes. Opposite ends of the carriage supported roller 110 mount annular, vertically disposed side guards 117 to laterally guide the sheet 12 and preclude lateral movement of the sheet 12 off the roller 110.

The downstream carriages 100A are generally identical to the upstream carriages 100 and generally similar parts will be identified by generally similar reference characters followed by the letter A subscript. The carriages 100A, however, are inverted relative to the carriage 100 and relative to the sheet 12. In the sheet threading positions, illustrated in FIGS. 4–6, the rolls 110A and 112A are disposed below the sheet 12 to vertically support the sheet 12 as it is being initially threaded through the machine between the inlet roller mechanisms 32 and the outlet roller mechanism 32A.

The carriages 100 also differ from the carriages 100A in that the carriages 100 also each includes a horizontally disposed sheet support pan 109, mounted on the underside of the carriage brackets 102 via bars 111 which are coupled to the carriage legs 101. The upstream edge portion 113 of the sheet support pan 109 is inclined in a downward direction to provide a guide for guiding the leading edge of the sheet 12 for sliding movement thereon onto the pan 109 as it is horizontally threaded through the machine. The sheet support pan 109 vertically supports the sheet 12 as it is being threaded through the machine. Because the sheet is not laterally captured, the sheet would otherwise sag if the pan 109 were not provided.

CARRIAGE DRIVE MECHANISM

The carriages 100 and 100A are concurrently moved in vertically opposite directions via a chain drive system, generally designated 120, including a frame mounted electrically operated, servomotor 121 coupled to a gear box 122 via a coupling 123. The gear box 122 includes an output shaft 123 which mounts an output sprocket wheel 124 that drives an endless chain 125 that is also trained around a sprocket wheel 126 fixed to a shaft 127 which is journaled on lower frame bar 20. Each end of the shaft 127 mounts a laterally spaced apart chain driving sprocket wheel 128 which drives an endless chain, generally designated 129, that is trained around a sprocket wheel 130, mounted on the lower frame bar, and sprocket wheels 131 and 132 journaled on the upper frame bar 18. The chain 130 is drivingly coupled to the carriages 100 and 100A via coupling members 133 and 134, respectively.

The sheet displacing rollers 110 and 112 engage the upper side 12' of the sheet 12 and the rollers 110A and 112A engage the underside 12" of the sheet 12 to concurrently vertically move upstream and downstream sheet portions 12B and 12C, respectively, in vertically opposite directions from the horizontally disposed, threaded positions, illustrated in FIG. 5 to the vertically displaced heating positions illustrated in FIG. 2.

After the sheet 12 is displaced, as illustrated in FIG. 2, the driver roller 43 is driven via the servomotor 67 to move the sheet 12 downstream, in the direction of the arrow 38.

METHOD OF PREHEATING AND OPERATION

The preheater 10 is positioned upstream of the thermoformer 14 and the preheater oven O is laterally removed to storage section S in the position illustrated in FIG. 4. The remaining parts will be assumed to be in the positions illustrated in FIG. 4–6. The sheet 12 is unwound from the roll 26 and initially passed between the inlet rolls 42 and 48, in the spaced apart positions illustrated in FIGS. 5 and 6. The sheet 12 is initially guided along and supported by the sheet support pans 109 mounted on the upstream carriages 100, then guided over downstream rollers 112A and 110A of downstream carriage 100A, and then between the downstream spaced apart idler rollers 42A and 48A. During this initial sheet threading, which disposes sheet portions 12A, 12B and 12C in the horizontal plane 36, the downstream drive roll 42A is not being driven.

The drive roll positioning cylinders 60A are then operated to swing the downstream nip forming roll 48A from the removed position, illustrated in FIG. 5, to the sheet gripping position, illustrated in FIG. 2, so that the downstream rolls 42A and 48A grip vertically opposite sides 13 and 15, respectively, of the sheet 12 to hold the sheet 12 and preclude the sheet 12 from moving upstream, in the direction of the arrow 38A, when the sheet portions 12B and 12C are subsequently displaced from the positions illustrated in FIG. 5 to the positions illustrated in FIG. 2. The cylinders 60 are also concurrently actuated to swing the upstream nip forming roll 48 to the nip forming position illustrated in FIG. 2 to engage vertically opposite sides 13 and 15 of the sheet 12. Since neither of the upstream idler rolls 48 and 50 are driven, they will allow the sheet 12 to pass therebetween as the sheet 12 is unwound from roll 26 and vertically displaced.

The servomotor 67 is then energized to drive the endless carriage translating chains 129, in the direction of the arrow 129A, to move the upstream carriage 100 downwardly and concurrently drive the downstream carriage 100A upwardly from the positions illustrated in FIG. 2 to the sheet displacing positions, illustrated in FIG. 4, to displace the upstream and downstream sheet portions 12B and 12C, respectively, out of the plane 36. As the sheet portions 12B and 12C are being vertically displaced, the sheet supply roll 26 will unwind to allow additional sheet to enter the preheater through the inlet roll mechanism 32. When the sheet portions 12B and 12C are displaced out of plane 36 to the vertically displaced positions illustrated in FIG. 2, the upstanding sheet portion 12A, between sheet portions 12B and 12C, will lie in a generally upstanding plane 39 transverse to the horizontal plane 36.

The upstanding sheet portion 12A is laterally aligned with the tunnel 83 in the oven O. The cylinder 95 is actuated to laterally translate the oven O from the removed inoperative position in storage section S, illustrated in FIG. 4, to the operative, sheet heating position, illustrated in FIGS. 1–3 in which the vertical sheet portion 12A is disposed in the tunnel 83 between the electrically operated heat emanating panels 80 and 82.

At this stage, the sheet drive motor 67 is energized to drive the chain 59 which drives the downstream drive roller 42A to move the sheet 12 downstream in the direction of the arrow 38. The sheet 12 will be preheated through a rather lengthy vertical path through tunnel 83 as it continues to pass a relatively short horizontal distance downstream in the direction of the arrow 38.

The sheet displacing carriages 100 and 100A allow the operator to quickly and easily preposition the sheet 12 and to provide the vertical sheet portion 12A without having to thread the sheet 12 around a plurality of vertically spaced rollers. While the sheet 12 travels through the oven O, it is laterally unrestrained and thus, can expand without wrinkling as it is presented to the thermoformer 14.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A preheater for preheating a thermoplastic sheet of thermoplastic material for entry into a differential pressure forming machine, said preheater comprising:

a frame having a heating station;

horizontally spaced apart inlet and outlet sheet guide means on said frame for receiving and passing a longitudinally extending thermoplastic sheet, having lateral edges, for movement longitudinally in a downstream path of travel;

heat emanating means forming a vertical tunnel through which said thermoplastic sheet passes at said sheet heating station;

means mounting said heat emanating means for lateral movement between a remote position, removed from said sheet, and a sheet heating position, at said sheet heating station, in which a section of said sheet is received by said tunnel;

first and second sheet positioning means on said frame, disposed longitudinally between said inlet and outlet sheet guide means, for receiving and passing upstream and downstream portions, respectively, of said sheet between said inlet and outlet sheet guide means; and displacement means on said frame mounting said first and second sheet positioning means for vertical movement in opposite directions between sheet threading positions adjacent said inlet and outlet sheet guide means, respectively, and vertically displaced, sheet displacing positions to concurrently vertically displace said upstream and downstream portions, respectively, of said sheet in vertically opposite directions to generally vertically dispose said section of said sheet in a generally vertical position, between said first and second sheet positioning means, to be received by said vertical tunnel of said heat emanating means in said sheet heating position.

2. The preheater set forth in claim 1 wherein said inlet and outlet guide means comprise inlet and outlet roller means, respectively, said outlet roller means comprising:

upper and lower rollers mounted on said frame for relative movement toward and away from each other between spaced apart positions in which said sheet can freely pass therebetween and closed, sheet gripping positions; and means for relatively moving said upper and lower rollers to said closed, sheet gripping positions as said first and second sheet positioning means move from said inoperative positions to said vertically displaced, sheet displacing position.

3. The preheater set forth in claim 1 wherein said first and second sheet positioning means comprise upstream and downstream vertically translatable carriages each mounting first and second, upstream and downstream, rollers for rotation about horizontal axes;

said displacement means comprising cooperating guides and slides mounted on said frame and said carriage for vertically guiding said first and second carriages and said first and second roller means between said sheet threading positions and said vertically displaced, sheet displacing positions.

4. The preheater set forth in claim 3 wherein said displacement means comprises rotatable means rotatably mounted on said frame;

carriage driving line means trained around said rotatable means and coupled to said upstream and downstream carriages; and motor means on said frame for moving said line means in opposite to-and-fro paths of travel to move said upstream and downstream carriages in vertically opposite directions.

5. The preheater set forth in claim 4 wherein said line means comprises an endless chain.

6. The preheater set forth in claim 3 wherein said first and second rollers on each of said carriages are horizontally spaced apart.

7. A preheater for preheating a thermoplastic sheet for a differential pressure forming machine utilized to differentially pressure form an article in said sheet, said preheater comprising:

a frame;

means on said frame for moving a thermoplastic sheet in a horizontal path of travel and in a generally horizontal plane to a differential pressure forming machine;

generally vertically disposed sheet heating means, mounted on said frame upstream of said differential pressure machine, for heating said sheet;

means for vertically displacing a portion of said sheet out of said horizontal plane to pass in a generally vertical path of travel in position to be heated by said generally vertically disposed heating means comprising:

upstream roller means on said frame for receiving and passing an upstream portion of said sheet;

downstream roller means on said frame for receiving and passing a downstream portion of said sheet;

means mounting said upstream roller means on said frame for vertical movement between an inoperative, sheet threading position receiving and passing said sheet in said horizontal plane and a vertically displaced, sheet displacing position to displace said upstream portion of said sheet in one vertical direction relative to said horizontal plane; and means mounting said downstream roller means on said frame for vertical movement in a direction opposite the direction of vertical movement of said upstream roller means between an inoperative position receiving and passing said sheet in said horizontal plane and a vertically displaced, sheet displacing position to displace said downstream portion of said sheet in an opposite vertical direction opposite said one vertical direction relative to said horizontal plane.

8. The preheater set forth in claim 7 wherein said upstream roller means and said downstream roller means comprise upstream and downstream, vertically moveable carriages respectively; each of said carriages including a pair of horizontally spaced apart rollers, rotatable thereon about horizontal axes, around which said sheet is trained, and including means for concurrently moving said upstream and downstream carriages in vertically opposite directions.

9. The preheater set forth in claim 8 including endless line means mounted on said frame for movement in to-and-fro opposite paths of travel; and means drivingly coupling said endless line means to said carriages, and motor means for reciprocally driving said endless line means in said to-and-fro paths of travel to drive said carriages in vertically opposite direction.

10. A preheater for preheating a thermoplastic sheet of material comprising:

a frame;

means on said frame for moving a thermoplastic sheet in a horizontal, downstream path of travel;

vertically disposed heater means on said frame for heating said sheet; and means for vertically displacing a section of said sheet out of said horizontal path of travel to pass a portion of said sheet in a generally upstanding path to be received by said heater means comprising vertically moveable, upstream and downstream sheet guide means mounted on said frame for concurrent vertical movement in to-and-fro vertically opposite directions of travel to concurrently vertically oppositely displace upstream and downstream portions of said sheet to vertically oppositely displaced positions to dispose said portion of said sheet between said upstream and downstream sheet guide means in said generally upstanding path.

11. The preheater set forth in claim 10 wherein said upstream and downstream sheet guide means each includes a vertically translatable carriage, and a pair of horizontally spaced apart rollers mounted on each carriage around which said sheet is trained.

12. The preheater set forth in claim 11 including a drive line, mounted on said frame for to-and-fro movement, coupled to said carriages; and motor means drivingly coupled to said drive line for moving said drive line in a to-and-fro path of travel to concurrently vertically move said carriages in vertically opposite directions between sheet threading positions adjacent each other and vertically displaced positions;

said upstream carriage means including a sheet support pan disposed below said rollers on said upstream carriage for supporting a portion of said sheet in said horizontal plane when said carriages are in said sheet threading positions.

13. A preheater for preheating a thermoplastic sheet of material in which an article is differentially pressure formed, said preheater comprising:

a frame;

means on said frame for longitudinally moving a sheet in a predetermined plane in a downstream, longitudinal path of travel;

transversely disposed heater means on said frame extending transversely to said predetermined plane;

means for transversely moving a portion of said sheet out of said plane and transversely positioning a subportion of said sheet in a transverse position to be received by said heater means comprising guide means for moving said portion of said sheet out of said plane and positioning said portion of said sheet in a serpentine path and positioning said subportion of said sheet in said transverse position to be received by said heater means; and means mounting said guide means for movement on said frame between sheet threading position, in which said portion of sheet remains in said plane, and a transversely disposed position, in which said guide means forces said portion of said sheet to follow said serpentine path.

14. The preheater set forth in claim 13 wherein said guide means comprises upstream and downstream roller means for concurrently moving upstream and downstream portions of said sheet in opposite directions relative to said predetermined plane between said inoperative positions and said transversely disposed positions.

15. The preheater set forth in claim 14 including upstream and downstream carriages mounting said upstream and downstream roller means; and drive means coupled to said carriage means for concurrently moving said carriages in to-and-fro paths of travel on said frame; and said means for transversely moving said sheet out of said plane including means for detachably gripping a portion of said sheet to preclude longitudinal movement of said sheet upstream as said guide means moves said sheet into said serpentine path;

said upstream carriage means including an underlying sheet support pan for supporting said sheet in said horizontal plane when said guide means is in said sheet threading position.

16. A preheater for preheating a thermoplastic sheet prior to passage of the sheet to a heated differentially pressure forming machine for forming an article in the heated sheet, said preheater comprising:

a frame having a sheet heating station;

means on said frame supporting a thermoplastic sheet in a generally horizontal plane for longitudinal movement in a downstream path of travel;

heating means mounted on the frame for heating the sheet at said sheet heating station including generally vertical heat emanating means forming a generally vertical tunnel for receiving, passing and heating a said sheet as said sheet passes downstream;

means mounting said heat emanating means on said frame for lateral movement between a laterally removed position and a sheet heating position adjacent said sheet at said sheet heating station; and means operative when said heat emanating means is in said laterally removed position for displacing a portion of said sheet out of said horizontal plane and guiding said portion of said sheet to travel generally vertically as it passes said heating station comprising upstream and downstream sheet displacement means for concurrently vertically displacing upstream and downstream portions, respectively, of said sheet in vertically opposite directions to provide a generally vertical sheet portion between said upstream and downstream sheet displacement means in an upstanding position to be received by said tunnel of said heat emanating means in said heating position.

17. The preheater set forth in claim 16 wherein each of said upstream and downstream sheet displacement means comprises a carriage, a pair of horizontally spaced sheet mounting rollers rotatably mounted on said carriage for rotation about generally horizontal axes, and cooperating slide and guide means on said carriage and frame mounting said carriage for vertical to-and-fro movement on said frame.

18. The preheater set forth in claim 17 including drive means mounted on said frame and coupled to each of said carriages for concurrently moving said carriages in vertically opposite, to-and-fro directions.

19. The preheater set forth in claim 16 including sheet gripping means on said frame, further downstream of said downstream sheet displacement means, for selectively gripping and holding said sheet as said upstream and downstream portions are being moved in opposite directions to preclude inadvertent upstream movement of said sheet.

20. The preheater set forth in claim 19, wherein said sheet gripping means comprises a pair of outlet rollers mounted on said frame for movement between spaced apart positions, removed from said sheet and sheet clamping positions clamped to vertically opposite sides of said sheet.

21. The preheater set forth in claim 20 including inlet roller means on said frame further upstream of said upstream sheet displacement means for receiving and passing said sheet, said upstream and downstream sheet displacement means being disposed between said inlet roller means and said pair of outlet rollers; said upstream sheet displacement means including an underlying sheet support means for vertically supporting said sheet in said horizontal plane.

22. A preheater for preheating a thermoplastic sheet in which an article is to be differentially pressure formed therein, said preheater comprising:

a frame having a sheet heating station;

means on said frame for supporting a continuous longitudinally extending thermoplastic sheet in a first plane at said sheet heating station;

displacement means on said frame for concurrently displacing upstream and downstream portions of said sheet in opposite directions relative to said first plane to dispose a portion of said sheet at said sheet heating station in a second plane transverse to said first plane;

heat emanating means for heating said portion of said sheet in said second plane at said sheet heating station; and means for moving said sheet in a downstream path of travel when said displacement means has displaced said upstream and downstream portions.

23. The preheater set forth in claim 22 wherein said heat emanating means includes means forming a generally vertical heat tunnel for receiving heating and passing said portion of said sheet in said second plane.

24. The preheater set forth in claim 23 including means mounting said heat emanating means for lateral movement between a remote position, laterally removed from said sheet and a heating position in which said vertical heat tunnel receives and heats said portion of said sheet in said second plane.

25. The preheater set forth in claim 24 wherein said means for concurrently displacing comprises
- upstream and downstream carriages each mounting a pair of longitudinally spaced apart rollers for rotatably guiding said sheet;
- means mounting said carriages on said frame for reciprocal vertical movement in vertically opposite directions;
- line means coupled between said carriages; and
- motor means for driving said line means.

26. The preheater set forth in claim 25 including sheet gripping means disposed further downstream of said downstream portion for gripping and holding said sheet as said upstream and downstream portions are being displaced in opposite directions.

27. The preheater set forth in claim 26 wherein said upstream carriage includes a sheet support pan, mounted on said upstream carriage in spaced relation beneath said rollers for supporting a portion of said sheet in said horizontal plane before said sheet is vertically displaced.

28. Apparatus for preheating thermoplastic sheet in which an article is to be differentially pressure formed therein comprising:
- means for threading a thermoplastic sheet downstream to dispose said sheet in a first plane;
- means for concurrently displacing upstream and downstream portions of said sheet in opposite directions relative to said first plane to dispose a transverse portion of said sheet in a second plane at a sheet heating station transverse to said first plane; and
- means for heating said transverse portion of said sheet at said sheet heating station in said second plane.

29. The apparatus set forth in claim 28 wherein said means for heating includes a heater mounted for lateral movement between a remote position, laterally removed from said sheet, to a sheet heating position adjacent said transverse portion after when upstream and downstream portions of said sheet have been displaced; and means is provided for selectively moving said sheet in a downstream path of travel.

30. The apparatus set forth in claim 29 wherein said means for moving said sheet includes means for horizontally moving said sheet, said means for concurrently displacing including a first upstream, sheet engaging guide and a second downstream sheet engaging guide, and means for vertically moving said first upstream sheet engaging guide in one vertical direction and concurrently vertically moving said second downstream, sheet engaging guide in a vertically opposite direction to dispose said transverse portion in a generally vertical plane.

31. The apparatus set forth in claim 28, including means for gripping and holding a portion of said sheet further downstream of said downstream portion of said sheet.

* * * * *